(12) United States Patent
Wimmer

(10) Patent No.: US 8,374,727 B2
(45) Date of Patent: Feb. 12, 2013

(54) ESTABLISHING SWITCHYARD ZONES OF A HIGH OR MEDIUM VOLTAGE SWITCHYARD

(75) Inventor: Wolfgang Wimmer, Rietheim (CH)

(73) Assignee: ABB Technology AG, Zurich (CH)

( * ) Notice: Subject to any disclaimer, the term of this patent is extended or adjusted under 35 U.S.C. 154(b) by 1217 days.

(21) Appl. No.: 12/188,730

(22) Filed: Aug. 8, 2008

(65) Prior Publication Data

US 2009/0005915 A1 Jan. 1, 2009

Related U.S. Application Data

(63) Continuation of application No. PCT/CH2007/000014, filed on Jan. 12, 2007.

(30) Foreign Application Priority Data

Feb. 8, 2006 (EP) .................................... 06405059

(51) Int. Cl.
*G05D 11/00* (2006.01)
(52) U.S. Cl. ............................. 700/286; 324/551; 307/4
(58) Field of Classification Search .................. 700/286, 700/292; 324/551; 307/4
See application file for complete search history.

(56) References Cited

U.S. PATENT DOCUMENTS

| | | | | |
|---|---|---|---|---|
| 5,408,176 A * | 4/1995 | Blatt | | 324/107 |
| 6,433,557 B1 * | 8/2002 | Rashkes et al. | | 324/551 |
| 6,489,782 B1 * | 12/2002 | Baier et al. | | 324/551 |
| 6,504,382 B2 * | 1/2003 | Smith et al. | | 324/551 |
| 7,062,359 B2 * | 6/2006 | Bjorklund | | 700/286 |
| 7,693,607 B2 * | 4/2010 | Kasztenny et al. | | 700/286 |
| 2004/0104784 A1 * | 6/2004 | Enriquez | | 333/24 R |
| 2006/0108871 A1 * | 5/2006 | Wimmer | | 307/4 |

FOREIGN PATENT DOCUMENTS

WO WO 2004/040731 A1 5/2004

OTHER PUBLICATIONS

PCT/ISA/210.
PCT/ISA/237.
EPO Form 1507.

* cited by examiner

*Primary Examiner* — Mohammad Ali
*Assistant Examiner* — Anthony Whittington
(74) *Attorney, Agent, or Firm* — Buchanan Ingersoll & Rooney PC

(57) ABSTRACT

The disclosure relates to minimizing the potential damage caused by the failure of a single central Intelligent Electronic Device (IED) responsible for calculating, assigning and storing information about switchyard zones of a high or medium voltage switchyard comprising switchyard elements interconnected by lines, and wherein the switchyard is operated by means of a Substation Automation system including a plurality of Intelligent Electronic Devices. For example, a distributed switchyard zone management is disclosed, comprising a distributed storage of the knowledge about the switchyard zones. Assignments of individual switchyard elements or components, such as switches and connectivity nodes, to the various switchyard zones are stored on several IEDs. If one of these IEDs fails, the services or applications based on switchyard zones thus are not necessarily doomed, as would be the case if the entire knowledge about switchyard zones were stored on one single central IED.

6 Claims, 2 Drawing Sheets

ESTABLISHING SWITCHYARD ZONES OF A HIGH OR MEDIUM VOLTAGE SWITCHYARD

RELATED APPLICATIONS

This application claims priority under 35 U.S.C. §119 to EP application 06405059.4 filed in Europe on Feb. 8, 2006, and as a continuation application under 35 U.S.C. §120 to PCT/CH2007/000014 filed as an International Application on Jan. 12, 2007 designating the U.S., the entire contents of which are hereby incorporated by reference in their entireties.

TECHNICAL FIELD

The disclosure relates to the field of substation automation. For example, a method of establishing switchyard zones of a high or medium voltage switchyard is disclosed.

BACKGROUND INFORMATION

Substations for power distribution in high and medium voltage power networks include primary or field devices such as electrical cables, lines, bus bars, disconnectors, circuit breakers, power transformers and instrument transformers arranged in switchyards and/or bays. These primary devices are operated in an automated way via a Substation Automation (SA) system responsible for controlling, protecting and monitoring of substations. The SA system comprises microprocessor based, programmable secondary devices, so-called Intelligent Electronic Devices (IED), interconnected in a SA communication network or local area network (LAN) and interacting with the primary devices via a process interface. The IEDs are generally assigned to one of three hierarchical levels, namely the station level including e.g. a Human-Machine Interface (HMI) and a gateway to a Network Control Centre (NCC), the bay level with its bay units for protection and control, and the process level directly at the switchgear. A process interface between the process and the bay level generally comprises isolation amplifiers for galvanic isolation of analogue inputs or optical couplers for galvanic isolation of binary process inputs.

IEDs on the bay level, also termed bay units, in turn are connected to each other and to the IEDs on the station level via an optical inter-bay or station bus. IEDs for protection and control are responsible for the protection of primary devices and continuously evaluate currents, voltages, temperatures measured locally, and locally disconnect lines or other components when these measurements indicate an emergency, overload or fault condition. These multi-functional protection and control devices with associated measurement and communication units are referred to as numerical, digital or protective relays. The monitoring, protection or control functions performed comprise for instance disturbance recording, overcurrent protection, differential protection, phase comparison, distance protection, breaker failure protection or bus bar protection.

For functions protecting against a failure of a primary device, like breaker failure protection or bus bar protection, which necessarily operate beyond the scope of the failing primary device, so called protection zones have to be considered. Protection zones are electrically connected parts of the switchyard, which are delimited by open disconnectors and open or closed circuit breakers. Accordingly, the relation between protection zones and switches, i.e. the disconnectors and circuit breakers, or their mutual assignment, is dynamically determined from the switchyard topology at single line level and from the present state of all disconnectors. Conventionally, even with distributed bus bar protection systems, the determination of the protection zones is done in one central IED that obtains all switch positions from the distributed bay units, calculates the zones, and occasionally transmits appropriate trip commands to the bays. In other words, both the calculation of the protection zones and the safekeeping and evaluation of this information are left to one central IED.

The concept of protection zones has been used for some time for breaker failure protection and for bus bar protection. By way of example, if a bay circuit breaker which is tripped by e.g. a line protection function would not open because of an internal failure, a so-called breaker failure protection function is triggered, and a trip signal is propagated to circuit breakers in protection zones adjacent to, i.e. to the left and right of, the failed circuit breaker. In other words, the task of breaker failure protection is to detect that a breaker has failed to clear a fault, and to trip all the remaining breakers feeding into the section containing the fault in order to clear the fault for good. Likewise, the task of bus bar protection is to detect any fault on the bus bar, and to trip the breakers connected to the affected bus bar.

SUMMARY

The disclosure relates to improving the availability and/or reliability of services or applications based on switchyard zones, in particular of bus bar or breaker failure protection applications of a substation automation system. A method of establishing switchyard zones of a high or medium voltage switchyard and a Substation Automation system are disclosed.

A method of establishing switchyard zones of a high or medium voltage switchyard is disclosed. Such a switchyard comprises switchyard elements interconnected by lines and wherein the switchyard is operated by means of a Substation Automation system including a plurality of Intelligent Electronic Devices. The method is triggered by a change in switchyard topology and comprises: calculating the switchyard zones depending on a present topology of the switchyard; assigning each switchyard element of a switchyard zone to said switchyard zone by means of a zone identification; and storing the zone identifications of the assigned switchyard elements in a distributed manner on at least two of the plurality of Intelligent Electronic Devices.

A substation automation system for operating a high or medium voltage switchyard comprising switchyard elements interconnected by lines and assigned to switchyard zones is disclosed. Such a substation automation system includes a plurality of intelligent electronic devices handling representations of the switchyard elements. The substation automation system is adapted to recalculate the switchyard zones if triggered by a change in switchyard topology, wherein a first zone identification assigning a first switchyard element to a switchyard zone is stored on a first intelligent electronic device handling a representation of the first switchyard element, and a second zone identification assigning a second switchyard element to a switchyard zone is stored on a second intelligent electronic device handling a representation of the second switchyard element.

In another aspect, a method of establishing switchyard zones of a high or medium voltage switchyard is disclosed. Such a method comprises detecting a change in switchyard topology based on a substation automation system used to operate the switchyard; calculating switchyard zones to identify zones based on a present topology of the switchyard; assigning switchyard elements of a switchyard zone based on a zone identification, the switchyard elements being interconnected; and storing the zone identifications associated with the assigned switchyard elements in a distributed manner on a plurality of intelligent electronic devices, wherein the substation automation system includes the plurality of intelligent electronic devices.

BRIEF DESCRIPTION OF THE DRAWINGS

The subject matter of the disclosure will be explained in more detail in the following text with reference to exemplary embodiments which are illustrated in the attached schematical drawings, in which.

The reference symbols used in the drawings, and their meanings, are listed in summary form in the list of reference symbols. In principle, identical parts are provided with the same reference symbols in the figures.

DETAILED DESCRIPTION

Figure 1:
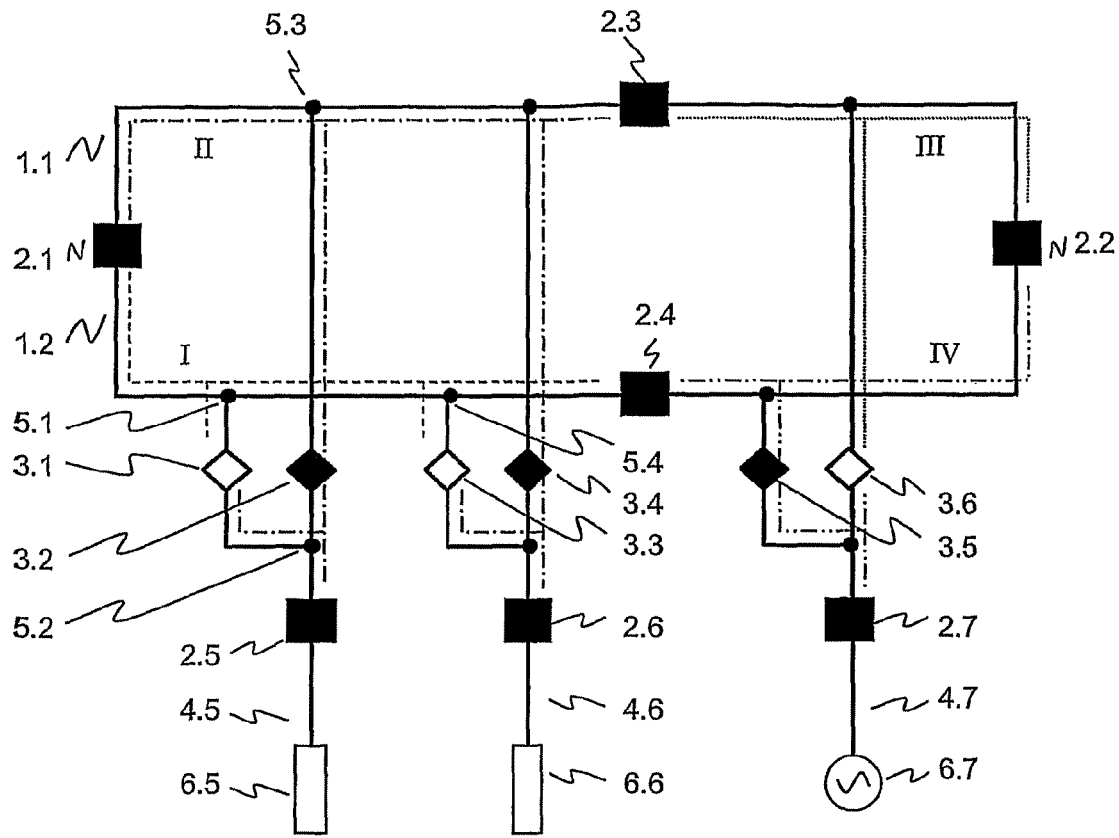
FIG. 1 shows a single line diagram of an exemplary switchyard with four protection zones.

According to the disclosure, the potential damage caused by the failure of a single central Intelligent Electronic Device (IED) responsible for calculating, assigning and storing information about switchyard zones is limited by introducing a distributed switchyard zone management. The latter comprises a distributed storage of the knowledge about the switchyard zones, which is to be distinguished from a purely redundant approach consisting of a mere duplication of said knowledge. In other words, assignments of individual switchyard elements or components, such as switches and connectivity nodes, to the various switchyard zones are stored on several IEDs. If one of these IEDs fails, the services or applications based on switchyard zones thus are not necessarily doomed, as would be the case if the entire knowledge about switchyard zones were stored on one single central IED.

The switchyard zones considered primarily are either protection zones or equipotential zones. The first comprise a number of switchyard elements that are to be isolated simultaneously in case of a failure of a primary device, and their boundary or circumference is defined by circuit breakers and open disconnectors. The second comprise a number of switchyard elements that are galvanically connected, simplify the determination of a bus bar voltage and are delimited by open switches, i.e. open circuit breakers or disconnectors.

In a first exemplary embodiment, a calculation of switchyard zones is done centrally in a conventional way, and the outcome of this calculation, i.e. the resulting knowledge about the zones, is subsequently distributed to various IEDs of the Substation Automation system.

In a second exemplary embodiment, the calculation of the switchyard zones is likewise performed in a distributed manner, without any central IED gathering all the knowledge. To this end, telegrams are exchanged between distributed IEDs according to an electrical single line diagram of the switchyard and comprising the switchyard elements (switches, connectivity nodes). This telegram exchange takes place entirely in a secondary system, i.e. over a local area network between protective relays on bay level, based on, for instance, EC61850 GOOSE messages exchanged on a communication bus. The telegrams are directed from a source to a target switchyard element, which elements correspondingly are allocated to the IEDs exchanging the telegrams. In other words, sending and receiving IEDs handle representations or instances of the source and target switchyard elements, respectively. A temporary zone identification of the source switchyard element is included in each telegram for exploitation on behalf of the target switchyard element.

In order to identify the switchyard elements to which telegrams are addressed, unique identifiers are attributed to all the switchyard elements. The unique identifier of a switchyard element, together with the unique identifiers of its nearest neighbors according to the single line diagram, i.e. its target switchyard elements, is stored on the IED to which the switchyard element is allocated.

In an exemplary embodiment of the disclosure, a dynamic recalculation of the switchyard zones is triggered by a change in switchyard topology such as a disconnector open/close. A reset phase is entered, during which reset telegrams with a zone identification equal to zero are exchanged. As soon as no more telegrams with non-zero zone identifications are circulating, an initialization phase commences. At the beginning of this phase, initialization messages are exchanged, which comprise the unique identifier of the source switchyard element as the temporary zone identification.

The present disclosure also relates to a computer program product including computer program code means for controlling the processors of two or more Intelligent Electronic Devices of a Substation Automation (SA) System in order to establish switchyard zones of a high or medium voltage switchyard operated by the SA system.

FIG. 1 depicts an electrical single-line diagram of a switchyard with an exemplary double busbar topology. The diagram comprises items or icons representative of various primary devices, such as bus bars 1, circuit breakers 2, disconnectors 3, line infeed or outgoing conductors 4, nodes 5, and loads or generators 6. Devices of the same kind are distinguished via a continued decimal digit, i.e. 5.1 and 5.2 denote two distinct nodes. Generally, icons representative of open switches (disconnectors and breakers), are shown outlined, whereas switches that are in a closed state are represented as filled icons, for instance, a closed/open disconnector is depicted by a black/white rhomb. Obviously, other topologies are conceivable, with or without bypass busses, and the topologies may comprise other primary devices such as power transformers, generators, earthing isolators and instrument transformers without limiting the applicability of the present disclosure. In the following, the distinction between the primary devices and their representation by icons or elements in the electrical line diagram on a drawing board, computer screen or other display is neglected.

Figure 2:
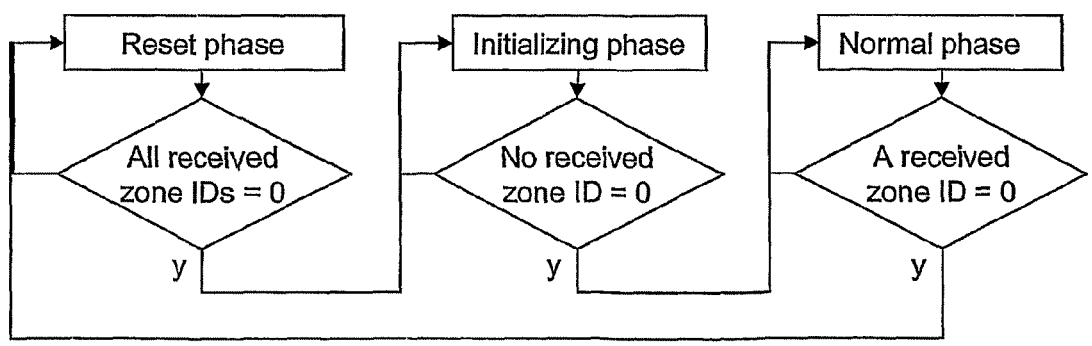
FIG. 2 is a flowchart of an exemplary dynamic zone recalculation procedure.

In detail, the topology depicted comprises two coupling circuit breakers 2.1, 2.2 separating two bus bars 1.1, 1.2, which in turn are divided in two sections by section circuit breakers 2.3, 2.4. Three bays are depicted, each comprising a bay circuit breaker 2.5, 2.6, 2.7 connected via conductors 4.5, 4.6, 4.7 to distant loads 6.5, 6.6 or a generator 6.7. The bay circuit breakers are each connectable to the two bus bars via two disconnectors 3.1, 3.2; 3.3, 3.4 and 3.5, 3.6. FIG. 2 additionally depicts two exemplary voltage transformers 7.6, 7.7 adjacent to bay circuit breakers 2.6, 2.7.

In addition to the primary devices depicted in FIGS. 1 and 2, substations comprise secondary equipment or Intelligent Electronic Devices (IEDs). In particular, at least one protection relay or bay unit is generally provided per bay for protecting the bay objects, e.g. line, transformer, generator, and controlling the bay circuit breaker. The bay unit acquires the disconnector states within the bay concerned and operates locally, i.e. without additional centralized calculation. In the following, message or telegram exchange between elements or primary devices is to be understood as a communication between the respective IEDs to which the elements are allocated and by which representations or instances of the primary device-objects are handled.

As mentioned above, protection zones are electrically connected parts of the switchyard which are delimited by open disconnectors and open or closed circuit breakers. In addition, defect or blocked circuit breakers are treated like closed disconnectors. The states of the disconnectors as depicted in FIG. 1 give rise to four protection zones I, II, III, IV in the sense of the present disclosure, which are indicated by broken lines of different patterns next to the sections of the bold-type single line diagram. In addition, load-side or line-protection zones are defined between bay circuit breakers 2.5, 2.6 and their loads 6.5, 6.6.

As outlined above, if e.g. circuit breaker 2.5 fails, then the circuit breakers 2.1, 2.3, 2.6 belonging to the two protection zones adjacent to the failed circuit breaker and internal to the substation have to trip or open. As the latter are controlled by their own protection relays, a fast and reliable signal transmission over a local area network between the protection relays is required. In fact, all protection relays are connected by a multi-peer communication system e.g. according to IEC61850, so that trips, starts and other information can be exchanged between the bay protection relays. Correspondingly, for breaker failure protection it has to be known which protection zones exist adjacent to each circuit breaker. According to the present disclosure, the failed circuit breaker sends a telegram with the breaker failure trigger and the identification(s) of the concerned zone(s) to all circuit breakers. Those circuit breakers that are on the border of the concerned zones (left or right of the circuit breaker) will then trip without any further centralized input or action due to the fact that they know by themselves to which protection zones they belong.

In the example above, only the connectivity node 5.2 at the bus bar side of the circuit breaker 2.5 handling the line 4.5 is considered. However, the method may be extended to include the line or outgoing conductor 4.5 as well, provided that a communication connection exists to a remote end of the line for telegram exchange. The line 4.5 in this case can also be considered as a protection zone and be included in the below-mentioned algorithm for the benefit of a common description and a simpler configuration.

In order to create the required knowledge about the protection zones, the switchyard topology is modelled by uniquely identified elements interconnected by line sections and classified in two types, switches and connectivity nodes. The unique identification is protection zone independent and best implemented by an easy-to-handle integer number, thus avoiding a common resource like a directory to guarantee uniqueness. Each switch knows at least the unique identity of its right and left connectivity nodes. When new elements are added to the switchyard they must be attributed a unique identifier as well, which is chosen in accordance with a configuration file, and in the advantageous case of integer numbers incrementally exceeds the previously highest attributed identifier. Addition of bays can thus be handled with minimal reconfiguration in the existing SA system.

The switches (for the purpose of breaker failure applications, this term is limited to circuit breakers and disconnectors, as earthing switches are irrelevant for protection zones) may change a status, e.g. from open to close, and are connected to static connectivity nodes in-between them. Healthy circuit breakers behave like open disconnectors, defect or blocked circuit breakers like closed disconnectors, the change between healthy and defect is thus handled like a disconnector state change between open and close.

In what follows, each element (switch, connectivity node) is unambiguously allocated its own processing means for handling telegrams, e.g. in the form of a hypothetical IED, meaning that the same type of telegrams is transmitted between any two elements. This corresponds to a maximum decentralized protection system. In reality however, it is most likely that a plurality of elements are allocated to a single IED, e.g. that a bay unit handles representations or instances of all the elements of its bay. In this case messages have to be physically exchanged only to elements beyond this bay and thus handled by other processors.

The exchange of telegrams according to the disclosure is governed by the following rules equally applicable to all the elements and further exemplified below. All elements exchange telegrams which are, in addition to the standard IED-related addressing, logically addressed either by the source, i.e. the unique identification of the sending element, or the sink, i.e. the unique identification of the target element. For instance, as a connectivity node is connected to many other elements, it sends a source addressed multicast telegram to all connected elements.

Telegrams Tv sent by a connectivity node to all connected switches thus comprise an identification of the sending connectivity node (Tv.id) as well as a protection zone identification index (Tv.zid) of the latter. This zone identification (zone-ID) may assume a service or temporary value, only in a steady state is it actually representative of the zone of the sending element. Telegrams sent by a switch to each of the two connectivity nodes it is connected to comprise an identification (Tsn.id) of the switch, where the index n (n=1, 2) is related to the respective addressed connectivity node on either side of the switch, the identification (Tsn.vid) of the addressed connectivity node, where obviously Ts1.vid≠Ts2.vid, and the protection zone identification index (Tsn.zid), where Ts1.zid≠Ts2.zid as long as the switch is a healthy circuit breaker or an open disconnector.

The value zero for the zone identification (zone-ID) is used to announce a reset or restart of the zone calculation e.g. in case that a disconnector opens or a circuit breaker is turned from defect to healthy. Following this, in a normal operation mode the zone-ID is calculated as the maximum of the zone-IDs of all connected connectivity nodes of the zone, resulting at the end of the calculation in a stable or converged protection zone distribution.

At a switch, telegram processing takes place either upon reception of a telegram from one of the neighbouring nodes, or following a change in a state of the switch itself, i.e. from closed to open or vice versa. If a telegram Tv is received from a first connectivity node connected to a first side of the switch and the switch is open, the received zone-ID is stored at the switch and inserted into a telegram Ts1 that is sent back to the first connectivity node. If the switch is closed, and the telegram received indicates a reset phase (Tv.zid=0), this news is spread further by means of telegrams with the zone-ID equaling zero that are output to both sides of the switch. If the switch is closed, and the telegram received carries a zone-ID different from zero, this value is compared to the value transmitted with the last telegram received from the second side and indicative of the second protection zone. If this one is likewise different from zero, the higher of the two non-zero values is put into outgoing messages spread to both sides and used internally on both sides as zone identification.

If the switch has been opened, telegrams with zone-ID zero are transmitted to both sides. If the switch has been closed, the maximum of the zone-IDs from left and right is set into both output telegrams as above.

At a connectivity node, telegram processing takes place as follows: If at least one, but not all, received zone-ID equals zero, the reset phase still has not completed, and this information is spread via outgoing messages to all connected elements. If, still at the connectivity node considered, all the received zone-IDs are zero, i.e. as soon as all the neighbours have received the zone-ID zero and responded by returning it, the reset phase is considered completed and the initializing or start phase is entered. Re-entering the reset mode is then disabled until the initializing phase has completed. In the initializing mode, a new zone calculation is started, and the aforementioned, unique and preferably integer-valued identification of each node is distributed. As soon as no more zone-IDs as received from the neighbouring switches at the connectivity node are zero, the initializing phase is likewise considered completed. Following this, the normal mode is entered, in which the maximum value of all received zone-IDs is repeatedly spread further as the value of the Tv.zid variable of the telegrams until a steady-state is reached. This succession of the various operation modes is depicted in the flowchart of FIG. 2.

A computer-based implementation of the present disclosure involves a technique known as "message-passing" that comprises routing of messages along the single line topology connections of an electrical network. If the entire electrical network is stored in the memory of a single computer, e.g. in a partially centralized implementation of the algorithm where only the tripping itself is decentralized, message passing can be implemented by some internal method. However, if said network has sections or entire substations on several distinct computers, a message-passing interface (MPI) is required for the exchange of the messages between the different computers or Intelligent Electronic Devices. For this purpose a corresponding standard as developed by a group of industry, academic, and government representatives with experience in developing and using message-passing libraries on a variety of computer systems can be used (see e.g. http://www.sgi.com/products/software/mpt/overview.html). However, due to the needed real time functionality within a protection system, the GOOSE message exchange of EC61850, a cyclic source addressed exchange as in IEC 61175 (MVB) or something similar is considered more appropriate.

As the relation between switches and their nearest-neighbor connectivity nodes is static in the single line diagram, the addressing of all telegrams could be statically configured and the destination variable Tsn.vid could be disposed of. However, a statically defined information flow might prohibit the handling of failed IEDs. In the latter case, and provided that the values of the unique identification of the next nearest neighbors are also known to the elements, the destination variables of the telegrams sent by the elements adjacent to the failed IED can be adapted in order to make sure that the failed IED is ignored during the abovementioned zone-calculation procedures. The latter than leads to larger protection zones encompassing two prior ones, and thus enhance the availability for breaker failure protection. A failed IED is most likely detected when using a cyclic telegram exchange, e.g. with a cyclic bus or via IEC 61850 GOOSE messages, in which case the steady-state zone-IDs keep being exchanged, and missing telegrams hint at a problem at the sender-IED.

In an exemplary embodiment, the above distinction between circuit breakers and disconnectors is blurred, and a zone boundary is defined exclusively by open switches. With this minor adaptation, execution of the above algorithm yields so-called equipotential zones instead of protection zones, comprising galvanically connected elements. This information can be used for instance to determine suitable bus bar Voltage Transformers (VT) for a synchrocheck function. To this end the VTs are, contrary to the protection zone calculation above, considered as elements just like the switches and nodes, and assigned unique identification numbers higher than all other identification numbers, thus ensuring that any steady-state zone-ID corresponds to a unique VT-identification. The zone-IDs of the equipotential zones left and right of an open circuit breaker thus immediately lead to the VTs to be used in the synchrocheck function.

Figure 3:
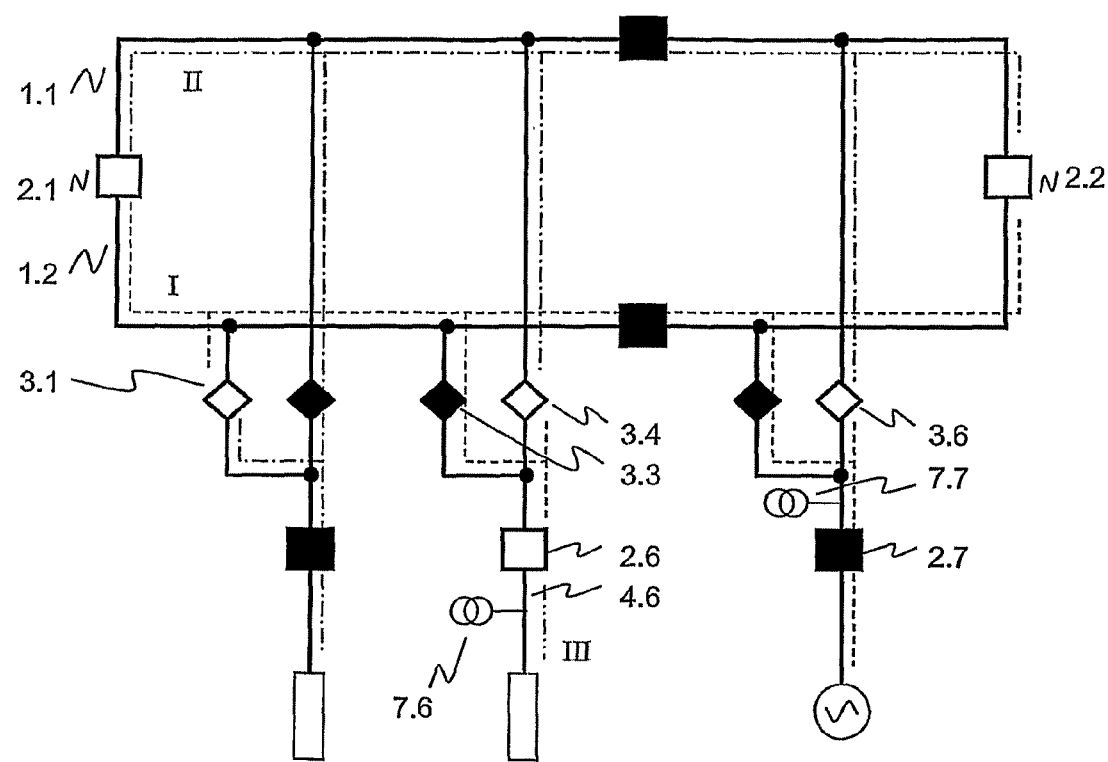
FIG. 3 shows the single line diagram of the exemplary switchyard with a different topology and three equipotential zones.

FIG. 3. depicts the outcome of such an equipotential zone calculation. The coupling circuit breakers 2.1 and 2.2 are now open, giving rise to two distinct equipotential zones each including a bus bar 1.1, 1.2 as indicated. Circuit breaker 2.6 is to be closed in order to connect the line 4.6. As no VT on the bus bar side next to the circuit breaker 2.6 has been provided, the extension of the corresponding equipotential zone nevertheless indicates that VT 7.7 next to circuit breaker 2.7 can serve for the purpose of a synchrocheck, together with VT 7.6 on the line side of the breaker 2.6.

If also earthing switch states are considered, this can result in a potential calculation to distinguish earthed parts, passive parts, and parts under voltage, e.g. as input to interlocking calculations or line colouring. Each potential gets an identification number, e.g. 0=passive, 2=earthed, 3=active, 4=unknown state (defect switch, state unknown)

The calculation of equipotential zones can also be used for the 'reverse blocking' function, i.e. the selective blocking of overcurrent protection on incoming lines in case that the failure cause can be cleared by the protection on a connected outgoing line. The current direction can be calculated locally and dynamically. If an outgoing overcurrent protection is started, the IED handling the overcurrent function belonging to a circuit breaker transmits the protection start as well as the zone identification of the circuit breaker to all other bays, and the overcurrent protection at all incoming bays of the same zone block their trip.

LIST OF DESIGNATIONS

1 bus bar
2 circuit breaker
3 disconnector
4 feeder or outgoing conductor
5 node
6 load
7 voltage transformer

What is claimed is:

1. A method of establishing switchyard zones of a high or medium voltage switchyard, wherein the switchyard comprises switchyard elements interconnected by lines and wherein the switchyard is operated by means of a Substation Automation system including a plurality of Intelligent Electronic Devices, and wherein the method is triggered by a change in switchyard topology and comprises:
    calculating the switchyard zones depending on a present topology of the switchyard;
    assigning each switchyard element of a switchyard zone to said switchyard zone by means of a zone identification; and
    storing the zone identifications of the assigned switchyard elements in a distributed manner on at least two of the plurality of Intelligent Electronic Devices, wherein the switchyard zones are calculated in a distributed manner by exchanging telegrams between the plurality of Intelligent Electronic Devices, each telegram being directed from a source switchyard element to a target switchyard element and comprising a zone identification of the source switchyard element.

2. The method according to claim 1, wherein the switchyard zones are protection zones delimited by circuit breakers and open disconnectors and comprising a number of switchyard elements that are to be simultaneously isolated from other switchyard elements as a protection against primary equipment failure in the high or medium voltage switchyard, or wherein the switchyard zones are equipotential zones delimited by open switches and comprising a number of switchyard elements that are on the same electrical potential.

3. The method according to claim 1, comprising:
attributing unique identifiers to the switchyard elements, storing the attributed identifiers of each switchyard element and the attributed identifiers of its nearest neighbours together with the zone identification of each switchyard element.

4. The method according to claim 3, comprising:
during a reset phase, sending reset telegrams with a zone identification equal to zero, and at the beginning of an initialisation phase following the reset phase, sending initialization telegrams with a zone identification equal to the unique identifier attributed to the source switchyard element of the initialization telegram.

5. A substation automation system for operating a high or medium voltage switchyard comprising switchyard elements interconnected by lines and assigned to switchyard zones, comprising:
a plurality of intelligent electronic devices handling representations of the switchyard elements, wherein the substation automation system is adapted to recalculate the switchyard zones if triggered by a change in switchyard topology,
wherein a first zone identification assigning a first switchyard element to a switchyard zone is stored on a first intelligent electronic device handling a representation of the first switchyard element, and a second zone identification assigning a second switchyard element to a switchyard zone is stored on a second intelligent electronic device handling a representation of the second switchyard element, and
wherein the substation automation system calculates the switchyard zones in a distributed manner by exchanging telegrams between the plurality of intelligent electronic devices, each telegram being directed from a source switchyard element to a target switchyard element and comprising a zone identification of the source switchyard element.

6. A method of establishing switchyard zones of a high or medium voltage switchyard, comprising:
detecting a change in switchyard topology based on a substation automation system used to operate the switchyard;
calculating switchyard zones to identify zones based on a present topology of the switchyard;
assigning switchyard elements of a switchyard zone based on a zone identification, the switchyard elements being interconnected; and
storing the zone identifications associated with the assigned switchyard elements in a distributed manner on a plurality of intelligent electronic devices, wherein the substation automation system includes the plurality of intelligent electronic devices,
wherein the switchyard zones are calculated in a distributed manner by exchanging telegrams between the plurality of intelligent electronic devices, each telegram being directed from a source switchyard element to a target switchyard element and comprising the zone identification of the source switchyard element.

* * * * *